United States Patent [19]

Okey et al.

[11] Patent Number: 4,837,251

[45] Date of Patent: Jun. 6, 1989

[54] DIMENSIONALLY-STABLE LIGHTWEIGHT CORE FOR COMPOSITE STRUCTURES

[75] Inventors: David W. Okey, Rockford, Ill.; John S. Church, Wilmington, Del.; Hossein Saatchi, Rockford; John F. Scanlon, Roscoe, both of Ill.

[73] Assignee: Sundstrand Corporation, Rockford, Ill.

[21] Appl. No.: 153,332

[22] Filed: Feb. 8, 1988

[51] Int. Cl.[4] .................... C08J 9/32

[52] U.S. Cl. .................... 523/218; 521/54; 523/219

[58] Field of Search .................... 523/219, 218; 521/54

[56] References Cited

U.S. PATENT DOCUMENTS

| | | | |
|---|---|---|---|
| 3,536,656 | 10/1970 | Sommer | 523/219 |
| 4,077,922 | 5/1978 | Farrissey, Jr. et al. | 523/219 |
| 4,361,453 | 11/1982 | Gagliani et al. | 521/184 |
| 4,363,690 | 12/1982 | Gagliani et al. | 521/184 |
| 4,489,181 | 12/1984 | Fox et al. | 523/219 |
| 4,595,623 | 6/1986 | Du Pont et al. | 428/195 |
| 4,692,480 | 9/1987 | Takahashi et al. | 523/219 |
| 4,738,988 | 4/1988 | Dietlein | 523/219 |

*Primary Examiner*—Morton Foelak
*Attorney, Agent, or Firm*—Wood, Dalton, Phillips, Mason & Rowe

[57] ABSTRACT

A composition for a pressure molded core of a composite structure, including a thermal plastic resin. The composition also includes a component to reduce the coefficient of thermal expansion, a lightweight high compressive strength filler, and a blowing agent. The thermoplastic resin may be polyetheretherketone, the component may be carbon fibers, and the filler may be hollow glass microspheres.

5 Claims, No Drawings

DIMENSIONALLY-STABLE LIGHTWEIGHT CORE FOR COMPOSITE STRUCTURES

FIELD OF THE INVENTION

This invention generally relates to composite structures and, particularly, to a composition for a pressure molded core of a composite stucture.

BACKGROUND OF THE INVENTION

Many composite structures are fabricated with a core, such as a foam core, sandwiched between a pair of skins which may comprise laminated layers. The cores often are molded by thermoset or thermoplastic compounds which often are not dimensionally controlled or controllable. This is because the coefficient of thermal expansion can be different in three mutually perpendicular axes, and can be large, when compared to isotropic materials of construction, such as metals. A typical epoxy resin used in composite materials may have as much as four times the coefficient of expansion of metal. Fillers and reinforcements can be added to the resin to add dimensional stability. For example, long continuous fibers may be added, such as carbon or glass fibers, to lessen the thermal expansion. Such fibers can be very effective to control the expansion along the length of the fiber but are not very effective in controlling expansion perpendicular to their length.

Attempts have been made to achieve isotropic thermal expansion control, while at the same time reinforcing and strengthening the material, by adding chopped fiber or fillers. This has become somewhat common and examples of such materials are carbon or glass fibers, clay, mica, Teflon, wollastonite, molybdenum disulfide, and a variety of other filler materials. However, such fibers often become oriented in a common plane, yielding low coefficients of thermal expansion in two directions but not the third. Although some degree of random orientation of the reinforcement has been achieved in thermoplastic resins, the result has not been totally satisfactory when forming relatively thin structures. Obviously, the reduction in the coefficient of thermal expansion corresponds to an increased amount of fiber disorientation. Another disadvantage in the use of fibers is that they are relatively heavy when lightweight core materials are desired.

Other attempts to achieve the desired properties in a core material have evolved around the addition of a filler material comprising microspheres. This material reduces the weight of the core but does not possess the dimensional control provided by fibrous material, such as carbon fibers. The use of microspheres, sometimes called microballoons, can present an additional problem in that the microballoons are prone to be crushed under high pressures. This problem is magnified when thermoplastic resins are desired in the composition, whereby the thermoplastic resins are quite amenable to injection molding, compression molding or extrusion, which involves the application of high pressures. Combining microspheres with fibrous materials has been proposed but balancing the parameters involved has not achieved satisfactory results. To achieve the required density, and use fibrous materials, blowing agents may have to be added. The conclusion is that the use of thermoplastic resins has become quite desirable in core compositions, but with the high pressures involved, the dimensional stability desired, and other related parameters and problems encountered, a new and improved composition is needed.

This invention is directed to satisfying the above need and solving the above problems.

SUMMARY OF THE INVENTION

An object, therefore, of the invention is to provide a new and improved composition for a pressure molded core of a composite structure.

In the exemplary embodiment of the invention, the composition includes a thermoplastic resin, a component to reduce the coefficient of thermal expansion, a lightweight, high compressive strength filler and a blowing agent.

In a preferred embodiment of the invention, the filler is made up of hollow microspheres, such as glass, selected from a group to have on the order of 10,000 psi compressive strength to withstand the high compression forces of injection molding, compression molding or extrusion. Carbon fibers may be used as the component to reduce the coefficient of thermal expansion. The thermoplastic resin may be polyetheretherketone. The blowing agent may be a known agent, such as boric acid.

A distinct advantage of glass or ceramic microspheres not only resides in a reduction of the density of the composition, but provides an unexpected beneficial increase in stiffness for the overall structure, as long as the integrity of the microspheres is maintained, i.e. preventing crushing or collapsing of the microspheres during high pressure of compressive fabrication processes.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description.

DETAILED DESCRIPTION OF THE INVENTION

Generally, the invention contemplates incorporating hollow microspheres, such as glass or ceramic microballoons, randomly oriented fibers such as carbon or glass, and a chemical blowing agent to the thermoplastic resin to achieve the desired end results in a core for a composite structure, wherein the core has low specific gravity, low and relatively isotropic coefficient of thermal expansion, and improved stiffness. Such materials are also useful in and of themselves as a lightweight structural material.

For example, the thermoplastic resin may comprise polyetheretherketone, polyetherketone, poly arylene sulfide, poly arylene ketone, poly aryl sulfone, or poly aryl ether sulfone. Glass microballoons and short carbon fibers are added to the thermoplastic resin. This product is extruded through a face plate and then cut into short lengths, typically ⅛ inch long and 1/12 inch wide, in a cylinder. This injection molding pellet is treated with the same care as conventional polymer pellets in terms of protection from moisture, etc.

The pellets then are mixed with a suitable amount of chemical blowing agent, such as boric acid, in the hopper of an injection molding machine. Alternatively, the blowing agent may be incorporated in the molding pellets themselves. The blowing agent could also be sodium tetra hydrido borate or potassium tetra hydrido borate. Normal precautions against contamination are followed by the use of shielded enclosures or dryers. The resin then can be injected molded into a suitable tool, with allowance for subsequent action of the blowing agent and the expansion of the material in the tool. Although generally flat or planar thicknesses of core material are common for subseqeunt sandwiching between outer skins or layers, molding the core composition of this invention can be done to fabricate irregular structures, such as housings for dynamoelectric machines, or the like. Other irregular shaped composite structures are contemplated. Copending applications Ser. No. 191,250, filed May 6, 1988, and Ser. No. 139,007, filed Dec. 29, 1987, which are assigned to the assignee of this invention are incorporated herein by reference.

Since pressure molding techniques often employ pressures as much as 30,000 psi, the microspheres should be selected from a group having proportionate size and wall dimensions to achieve a compressive strength on the order of 10,000 psi. This will enable the microspheres to withstand the overall molding forces without crushing or collapsing.

The composition of the invention may have up to 40% of a component to reduce the coefficient of thermal expansion, up to 40% of the lightweight high compressive strength filler, and between 0.01% and 0.25% blowing agent, with the thermoplastic resin making up the balance.

The properties achieved by the above-described composition have been unexpected. The hollow microspheres yield lower density and also greater flexural and tensile stiffness. The short carbon fibers yield better control over other properties, such as providing a low coefficient of thermal expansion or better thermal or electrical conductivity. Lower fiction coefficients and higher impact strengths have been encountered than when using known core compositions which may be readily available. The added blowing agent reduces density, and parts have been fabricated as low as 0.5b/cc. The combination of the invention has achieved low density as well as the additional properties gained.

The microspheres not only yield lower weight but obtain higher stiffness. The increase in tensile modules of such a lightened product has been unexpected. Expectations would appear to be a degraded value of stiffness with less density. Instead, the incorporation of the hollow microspheres has added greater stiffness in an unexpected fashion within the overall combination. Since many structural parts are stiffness-critical, rather than strength-critical, the invention has a wide range of applications.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A composition for a pressure molded core of a composite structure, consisting essentially of:

a thermoplastic resin selected from the group consisting of polyetheretherketone, polyetherketone, poly arylene sulfide, poly arylene ketone, poly aryl sulfone, and poly aryl ether sulfone;

an inorganic fibrous material filler to reduce the coefficient of thermal expansion;

an inorganic hollow microsphere filler of high compressive strength; and a blowing agent.

2. The composition of claim 1 wherein said component comprises carbon fibers.

3. The composition of claim 1 wherein said component comprises glass fibers.

4. The composition of claim 1 wherein said hollow microspheres are fabricated of glass.

5. The composition of claim 1 wherein said microspheres are selected of a group to have on the order of 10,000 psi compressive strength.

* * * * *